United States Patent
Watanabe et al.

(10) Patent No.: US 9,022,901 B2
(45) Date of Patent: May 5, 2015

(54) COAST STOP VEHICLE AND CONTROL METHOD THEREOF

(75) Inventors: Shinichiro Watanabe, Yokohama (JP); Keichi Tatewaki, Atsugi (JP); Naohiro Yamada, Atsugi (JP); Noritaka Aoyama, Atsugi (JP)

(73) Assignee: JATCO Ltd, Fuji-shi (JP)

( * ) Notice: Subject to any disclaimer, the term of this patent is extended or adjusted under 35 U.S.C. 154(b) by 0 days.

(21) Appl. No.: 13/240,683

(22) Filed: Sep. 22, 2011

(65) Prior Publication Data
US 2012/0083388 A1 Apr. 5, 2012

(30) Foreign Application Priority Data

Oct. 1, 2010 (JP) ................................. 2010-223445

(51) Int. Cl.
*F16H 61/662* (2006.01)
*F16H 61/16* (2006.01)
*F16H 37/02* (2006.01)
*F16H 61/70* (2006.01)
*F16H 59/18* (2006.01)

(52) U.S. Cl.
CPC ........ *F16H 61/66259* (2013.01); *F16H 37/022* (2013.01); *F16H 61/16* (2013.01); *F16H 61/702* (2013.01); *F16H 2037/023* (2013.01); *F16H 2059/186* (2013.01); *F16H 2061/163* (2013.01); *F16H 2312/14* (2013.01)

(58) Field of Classification Search
None
See application file for complete search history.

(56) References Cited

U.S. PATENT DOCUMENTS

| 4,616,530 | A * | 10/1986 | Tanaka et al. ................... 477/41 |
| 4,977,798 | A * | 12/1990 | Takahashi ........................ 477/46 |
| 6,379,278 | B1 * | 4/2002 | Eguchi et al. ................... 477/34 |
| 7,065,441 | B2 * | 6/2006 | Yamamoto et al. ............. 701/51 |
| 7,374,510 | B2 * | 5/2008 | Unno et al. ...................... 477/44 |
| 8,308,606 | B2 | 11/2012 | Müller et al. |
| 2006/0030449 | A1 * | 2/2006 | Tsukada et al. ................... 477/3 |
| 2008/0146409 | A1 * | 6/2008 | Yamaguchi et al. ............ 477/44 |
| 2009/0194176 | A1 | 8/2009 | Müller et al. |

FOREIGN PATENT DOCUMENTS

| DE | 195 32 163 A1 | 3/1997 |
| JP | 07-266932 A | 10/1995 |
| JP | 2001-012590 A | 1/2001 |
| JP | 2002-323130 A | 11/2002 |
| JP | 2005-233252 A | 9/2005 |
| JP | 2006-170295 A | 6/2006 |
| JP | 2007-270933 A | 10/2007 |
| WO | WO 2009/076926 A1 | 6/2009 |

* cited by examiner

*Primary Examiner* — Ramya Burgess
*Assistant Examiner* — Mark Manley
(74) *Attorney, Agent, or Firm* — Foley & Lardner LLP

(57) ABSTRACT

A coast stop vehicle which stops an engine during the travel of the vehicle is provided with a variator including a pair of pulleys and a belt mounted between the pulleys and capable of continuously changing a speed ratio. A controller judges whether or not coast stop conditions to stop the engine during the travel of the vehicle hold, stops the engine when the coast stop conditions hold, and prevents the speed ratio from being upshifted to a higher side than a speed ratio at the time of starting the coast stop control during the coast stop control.

20 Claims, 6 Drawing Sheets

COAST STOP VEHICLE AND CONTROL METHOD THEREOF

TECHNOLOGICAL FIELD OF THE INVENTION

The present invention relates to a coast stop vehicle and a control method thereof.

BACKGROUND OF THE INVENTION

A vehicle which automatically stops an engine during the travel of the vehicle to improve fuel economy (hereinafter, referred to as a coast stop vehicle) is disclosed in JP2006-170295A.

SUMMARY OF THE INVENTION

When a coast stop control is executed in a vehicle including a continuously variable transmission, a speed ratio of the continuously variable transmission may be changed due to a change in a hydraulic pressure supplied to the continuously variable transmission during the coast stop control. If the speed ratio of the continuously variable transmission is changed to a high side during the coast stop control and a restart request or a re-acceleration request is made from a driver in this state, there is a problem that a drive force becomes insufficient at the time of restart or re-acceleration.

The present invention was developed to solve such a problem and aims to prevent a speed ratio of a continuously variable transmission from being changed to a high side during a coast stop control and prevent a drive force from becoming insufficient when a restart request or a re-acceleration request is made from a driver.

A coast stop vehicle according to a certain aspect of the present invention is a coast stop vehicle which stops an engine during the travel of the vehicle and includes a continuously variable transmission including a pair of pulleys and a belt mounted between the pulleys and capable of continuously changing a speed ratio, a coast stop condition judging unit for judging whether or not a coast stop condition to stop the engine during the travel of the vehicle holds, a coast stop control unit for executing a coast stop control to stop the engine when the coast stop condition holds, and an upshift preventing unit for preventing the speed ratio from being upshifted to a higher side than a speed ratio at the time of starting the coast stop control during the coast stop control.

A control method according to another aspect of this invention is used to control a coast stop vehicle which includes continuously variable transmission including a pair of pulleys and a belt mounted between the pulleys and capable of continuously changing a speed ratio and stops an engine during the travel of the vehicle. The control method includes judging whether or not a coast stop condition to stop the engine during the travel of the vehicle holds, executing a coast stop control to stop the engine when the coast stop condition holds, and preventing the speed ratio from being upshifted to a higher side than a speed ratio at the time of starting the coast stop control during the coast stop control.

According to this aspect, the speed ratio is not upshifted to the higher side than the speed ratio at the time of starting the coast stop control during the coast stop control and a drive force does not become insufficient when a restart request or a re-acceleration request is made from a driver. Thus, the driver can restart or re-accelerate the vehicle without a sense of discomfort.

DESCRIPTION OF PREFERRED EMBODIMENT

Hereinafter, an embodiment of the present invention is described with reference to the accompanying drawings. Note that, in the following description, a "speed ratio" of a certain transmission mechanism is a value obtained by dividing an input rotation speed of this transmission mechanism by an output rotation speed thereof. Further, a "lowest speed ratio" is a maximum speed ratio of this transmission mechanism used such as at the time of starting a vehicle. A "highest speed ratio" is a minimum speed ratio of this transmission mechanism.

Figure 1:
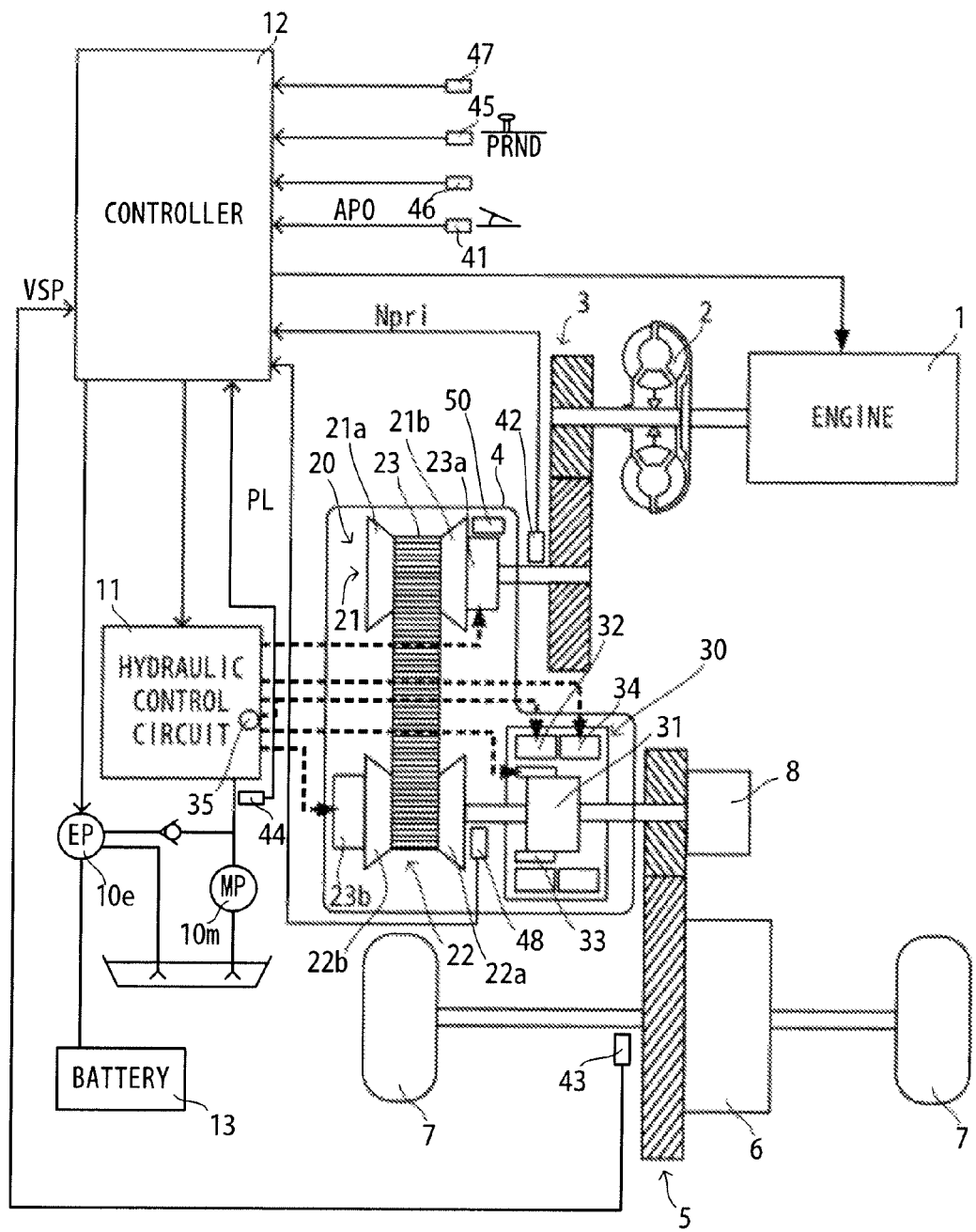
FIG. 1 is a schematic construction diagram of a coast stop vehicle according to an embodiment.

FIG. 1 is a schematic construction diagram of a coast stop vehicle according to the embodiment of the present invention. This vehicle includes an engine 1 as a driving source, and output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a final speed reducer 6. The second gear train 5 includes a parking mechanism 8 for mechanically locking an output shaft of the transmission 4 in a parked state so as not to be able to rotate.

The transmission 4 is provided with a mechanical oil pump 10$m$ to which the rotation of the engine 1 is input and which is driven by utilizing a part of power of the engine 1 and an electrical oil pump 10$e$ which is driven upon receiving the supply of power from a battery 13. The electrical oil pump 10$e$ is composed of an oil pump main body, and an electric motor and a motor driver for driving and rotating the oil pump main body. The electrical oil pump 10$e$ can control a driving load to a desired load or in multiple stages. Further, the transmission 4 includes a hydraulic control circuit 11 for adjusting a hydraulic pressure (hereinafter, referred to as a "line pressure PL") from the mechanical oil pump 10$m$ or the electrical oil pump 10$e$ and supplying the adjusted hydraulic pressure to the respective components of the transmission 4.

The transmission 4 includes a V-belt continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train). Alternatively, the sub-transmission mechanism 30 may be connected to a front side (input shaft side) of the variator 20.

The variator 20 includes a primary pulley 21, a secondary pulley 22 and a V-belt 23 mounted between the pulleys 21 and 22. Each of the pulley 21, 22 includes a fixed conical plate 21$a$, 22$a$, a movable conical plate 21$b$, 22$b$ arranged with a sheave surface faced toward the fixed conical plate 21$a$, 22$a$ and forming a V-groove between the fixed conical plate 21$a$, 22a and the movable conical plate 21b, 22b, and a hydraulic cylinder 23a, 23b provided on the back surface of the movable conical plate 21b, 22b for displacing the movable conical plate 21b, 22b in an axial direction. When hydraulic pressures supplied to the hydraulic cylinders 23a, 23b are adjusted, the widths of the V-grooves change to change contact radii of the V-belt 23 and the respective pulleys 21, 22, whereby a speed ratio of the variator 20 continuously changes. The variator 20 also includes a stopper 50 for restricting a movement of the movable conical plate 21b in a direction to widen the V-groove of the primary pulley 21 so that the V-belt 23 does not come off. Note that when the speed ratio is the lowest speed ratio, a predetermined hydraulic pressure is supplied to the hydraulic cylinder 23a of the primary pulley 21 and the movable conical plate 21b does not contact with the stopper 50.

A pressure receiving area of the hydraulic cylinder 23a of the primary pulley 21 is preferably made larger to increase a torque capacity even when the hydraulic pressure supplied to the hydraulic cylinder 23a of the primary pulley 21 is low. The primary pulley 21 and the secondary pulley 22 are so set that the pressure receiving area of the primary pulley 21 is larger than that of the secondary pulley 22.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If hydraulic pressures supplied to the respective frictional engagement elements 32 to 34 are adjusted to change engaged and released states of the respective frictional engagement elements 32 to 34, a gear position of the sub-transmission mechanism 30 is changed.

For example, the sub-transmission mechanism 30 is set to a first gear position if the low brake 32 is engaged and the high clutch 33 and the reverse brake 34 are released. The transmission mechanism 30 is set to a second gear position with a gear ratio lower than in the first gear position if the high clutch 33 is engaged and the low brake 32 and the reverse brake 34 are released. The sub-transmission mechanism 30 is set to a reverse gear position if the reverse brake 34 is engaged and the low brake 32 and the high clutch 33 are released. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

The respective frictional engagement elements are provided before or behind the variator 20 on the power transmission path, and any of them enables power transmission of the transmission 4 when being engaged while disabling power transmission of the transmission 4 when being released.

Further, an accumulator 35 is connected at an intermediate position of an oil path for supplying the hydraulic pressure to the low brake 32. The accumulator 35 delays the supply and discharge of the hydraulic pressure to and from the low brake 32, suppresses a sudden increase in the hydraulic pressure supplied to the low brake 32 by accumulating the hydraulic pressure at the time of selecting a N-D shift and prevents the occurrence of a shock due to sudden engagement of the low brake 32.

Figure 2:
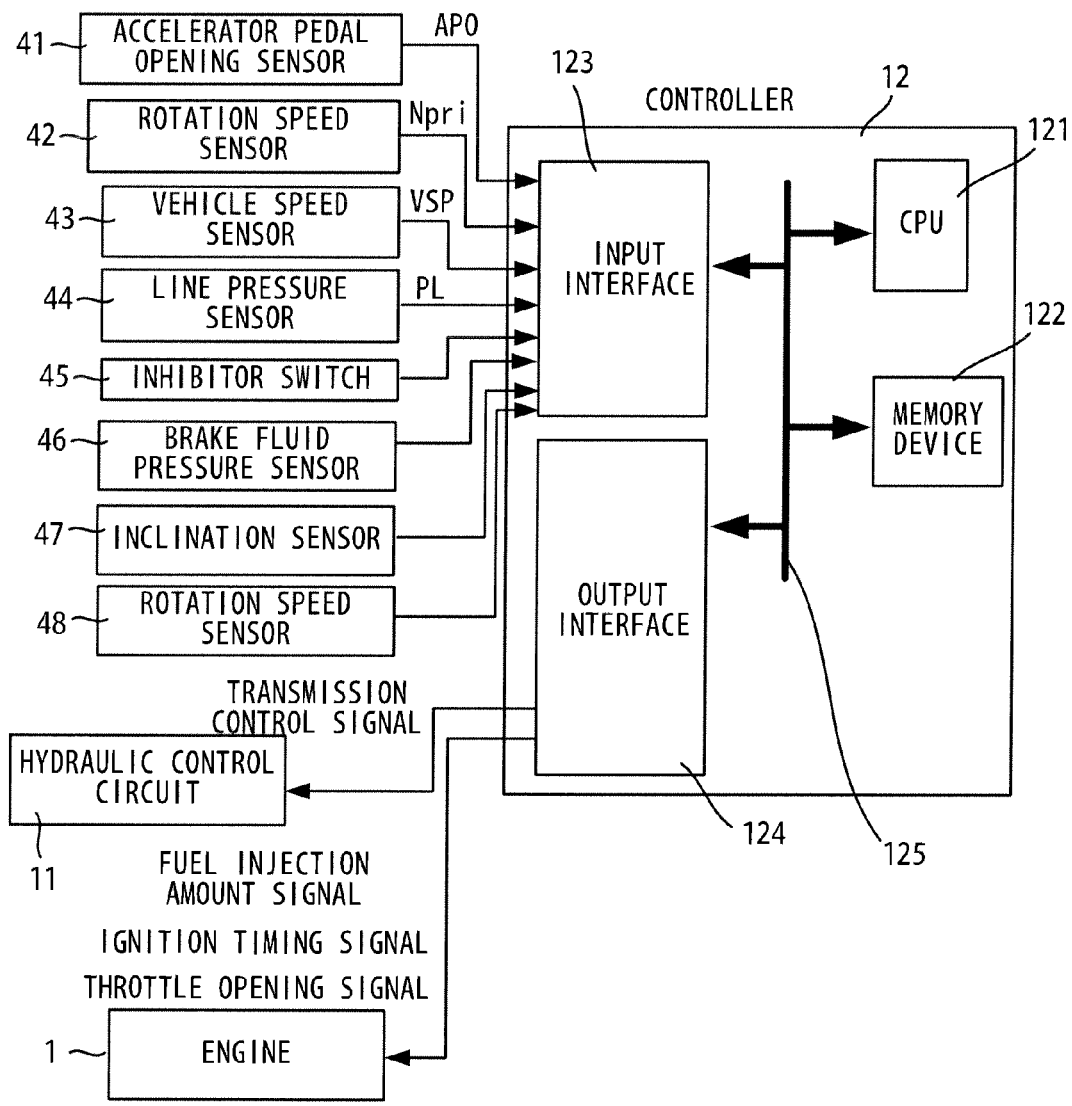
FIG. 2 is a schematic construction diagram of a controller of the embodiment.

A controller 12 is a controller for controlling the engine 1 and the transmission 4 in a comprehensive manner and includes a CPU 121, a memory device 122 composed of a RAM/ROM, an input interface 123, an output interface 124 and a bus 125 which connects these components to each other as shown in FIG. 2.

The input interface 123 are input an output signal of an accelerator pedal opening sensor 41 for detecting an accelerator pedal opening APO which is an operated amount of an accelerator pedal, an output signal of a rotation speed sensor 42 for detecting an input rotation speed of the transmission 4 (=rotation speed of the primary pulley 21, hereinafter, referred to as a "primary rotation speed Npri"), an output signal of a rotation speed sensor 48 for detecting an output rotation speed of the transmission 4 (=rotation speed of the secondary pulley 22, hereinafter, referred to as a "secondary rotation speed Nsec"), an output signal of a vehicle speed sensor 43 for detecting a vehicle speed VSP, an output signal of a line pressure sensor 44 for detecting the line pressure PL, an output signal of an inhibitor switch 45 for detecting the position of a select lever, an output signal of a brake fluid pressure sensor 46 for detecting a brake fluid pressure, an output signal of an inclination sensor 47 for detecting the inclination of the vehicle body road gradient), and like output signals.

A control program of the engine 1, a transmission control program of the transmission 4, and various maps/tables used in these programs are stored in the memory device 122. The CPU 121 reads the programs stored in the memory device 122 and implements them, performs various computations on various signals input via the input interface 123 to generate a fuel injection quantity signal, an ignition timing signal, a throttle opening signal, a transmission control signal and a drive signal for the electrical oil pump 10e and outputs the generated signals to the engine 1, the hydraulic control circuit 11, the motor driver of the electrical oil pump 10e via the output interface 124. Various values used in the computations by the CPU 121 and computation results are appropriately stored in the memory device 122.

The hydraulic control circuit 11 is composed of a plurality of flow paths and a plurality of hydraulic control valves. In accordance with the transmission control signal from the controller 12, the hydraulic control circuit 11 controls the plurality of hydraulic control valves to switch supply paths of the hydraulic pressures, prepares a necessary hydraulic pressure from a hydraulic pressure produced by the mechanical oil pump 10m or the electrical oil pump 10e, and supplies this hydraulic pressure to the respective components of the transmission 4. In this way, the speed ratio of the variator 20 and the gear position of the sub-transmission mechanism 30 are changed to shift the transmission 4.

Figure 3:
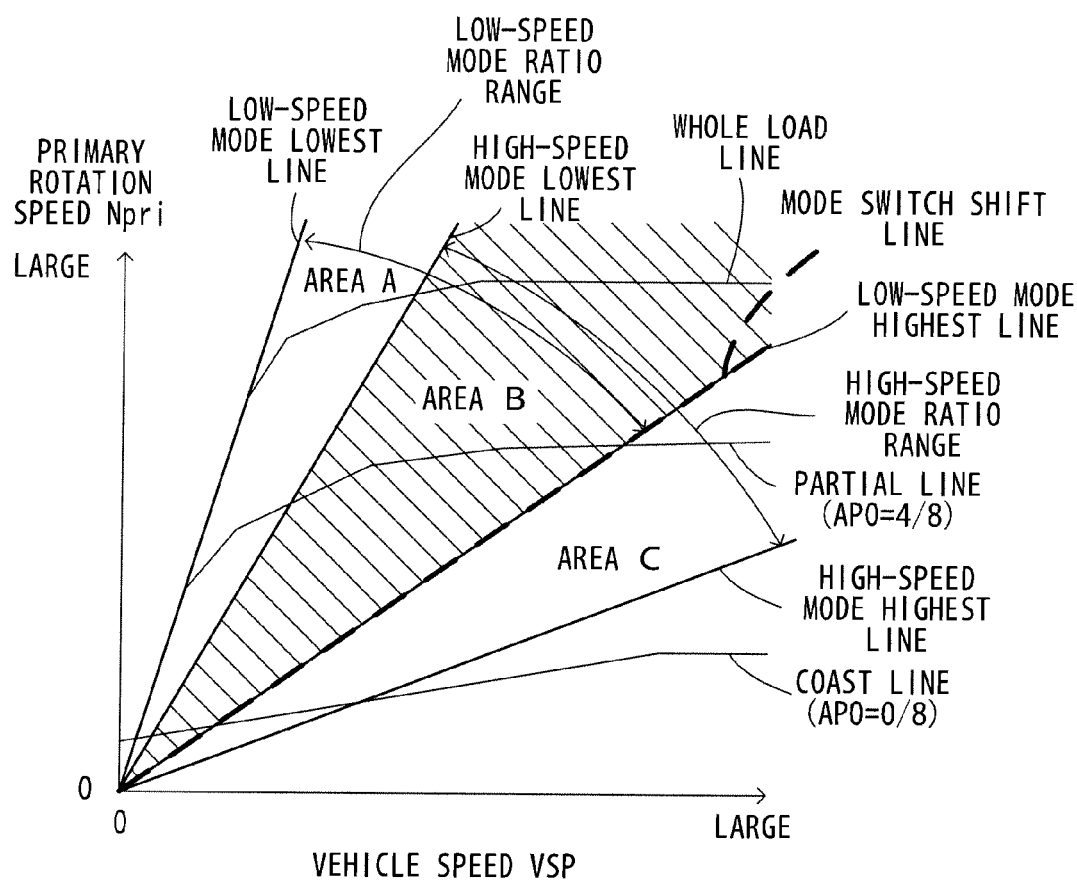
FIG. 3 is a graph showing an example of a shift map.

FIG. 3 shows an example of a shift map stored in the memory device 122. The controller 12 controls the variator 20 and the sub-transmission mechanism 30 according to a driving condition of the vehicle (in this embodiment, vehicle speed VSP, primary rotation speed Npri, secondary rotation speed Nsec, accelerator pedal opening APO) based on this shift map.

In this shift map, an operating point of the transmission 4 is defined by the vehicle speed VSP and the primary rotation speed Npri. The inclination of a line connecting the operating point of the transmission 4 and a zero point at the lower left corner of the shift map corresponds to the speed ratio of the transmission 4 (overall speed ratio obtained by multiplying the speed ratio of the variator 20 by a speed ratio of the sub-transmission mechanism 30, hereinafter, referred to as a "through speed ratio"). In this shift map, a shift line is set for each accelerator pedal opening APO similar to a shift map of a conventional V-belt continuously variable transmission, and the transmission 4 is shifted in accordance with the shift line selected based on the accelerator pedal opening APO. Note that, for simplicity, only a whole load line (shift line when the accelerator pedal opening APO=8/8), a partial load line (shift line when the accelerator pedal opening APO=4/8) and a coast line (shift line when the accelerator pedal opening APO=0/8) are shown in FIG. 3.

When being in the low-speed mode, the transmission 4 can be shifted between a low-speed mode lowest line obtained by setting the speed ratio of the variator 20 to the lowest speed ratio and a low-speed mode highest line obtained by setting the speed ratio of the variator 20 to the highest speed ratio. In this case, the operating point of the transmission 4 moves in areas A and B. On the other hand, when being in the high-speed mode, the transmission 4 can be shifted between a high-speed mode lowest line obtained by setting the speed ratio of the variator 20 to the lowest speed ratio and a high-speed mode highest line obtained by setting the speed ratio of the variator 20 to the highest speed ratio. In this case, the operating point of the transmission 4 moves in areas B and C.

The speed ratio of each gear position of the sub-transmission mechanism 30 is so set that the speed ratio corresponding to the low-speed mode highest line (low-speed mode highest speed ratio) is lower than the speed ratio corresponding to the high-speed mode lowest line (high-speed mode lowest speed ratio). By this, a range of the through speed ratio of the transmission 4 that can be set in the low-speed mode ("low-speed mode ratio range" in FIG. 3) and a range of the through speed ratio of the transmission 4 that can be set in the high-speed mode ("high-speed mode ratio range" in FIG. 3) partly overlap, and the transmission 4 can be selectively set in either one of the low-speed mode and the high-speed mode if the operating point of the transmission 4 is in the area B defined between the high-speed mode lowest line and the low-speed mode highest line.

Further, on this shift map, a mode switch shift line at which the sub-transmission mechanism 30 is shifted is so set as to overlap the low-speed mode highest line. A through speed ratio corresponding to the mode switch shift line (hereinafter, referred to as a "mode switch speed ratio mRatio") is set at a value equal to the low-speed mode highest speed ratio. The mode switch shift line is set in this way because an input torque to the sub-transmission mechanism 30 decreases as the speed ratio of the variator 20 decreases and a shift shock when the sub-transmission mechanism 30 is shifted is suppressed.

When the operating point of the transmission 4 crosses the mode switch shift line, i.e. an actual value of the through speed ratio (hereinafter, referred to as an "actual through speed ratio Ratio") changes over the mode switch speed ratio mRatio, the controller 12 performs a synchronization shift described below to switch between the high-speed mode and the low-speed mode.

In the synchronization shift, the controller 12 shifts the sub-transmission mechanism 30 and changes the speed ratio of the variator 20 in a direction opposite to a direction in which the speed ratio of the sub-transmission mechanism 30 changes. At this time, an inertial phase in which the speed ratio of the sub-transmission mechanism 30 actually changes and a period during which the speed ratio of the variator 20 changes are synchronized. The speed ratio of the variator 20 is changed in the direction opposite to the changing direction of the speed ratio of the sub-transmission mechanism 30 so that a change in input rotation caused by a difference in the actual through speed ratio Ratio does not give a sense of discomfort to a driver.

Specifically, when the actual through speed ratio Ratio of the transmission 4 changes over the mode switch speed ratio mRatio from the low side to the high side, the controller 12 changes the gear position of the sub-transmission mechanism 30 from the first gear position to the second gear position (1-2 shift) and changes the speed ratio of the variator 20 to the low side.

Conversely, when the actual through speed ratio Ratio of the transmission 4 changes over the mode switch speed ratio mRatio from the high side to the low side, the controller 12 changes the gear position of the sub-transmission mechanism 30 from the second gear position to the first gear position (2-1 shift) and changes the speed ratio of the variator 20 to the high side.

Further, the controller 12 executes a coast stop control described below to suppress a fuel consumption amount.

The coast stop control is a control for suppressing the fuel consumption amount by automatically stopping the engine 1 while the vehicle is running in a low vehicle speed region (coast stop). This control is common to a fuel cut control executed when the accelerator is off in that fuel supply to the engine 1 is stopped, but differs therefrom in that the lock-up clutch and the low brake 32 are released to cut off the power transmission path between the engine 1 and the drive wheels 7 and completely stop the rotation of the engine 1.

Upon executing the coast stop control, the controller 12 first judges, for example, conditions a to d listed below. These conditions are, in other words, conditions to judge whether or not a driver has an intention to stop the vehicle.

a: accelerator pedal is not depressed at all (accelerator pedal opening APO=0)
b: brake pedal is depressed (brake fluid pressure is a predetermined value or higher)
c: vehicle speed is a predetermined low speed (e.g. 15 km/h) or lower
d: lock-up clutch is released.

The controller 12 executes the coast stop control when all of these coast stop conditions are met.

Figure 4:
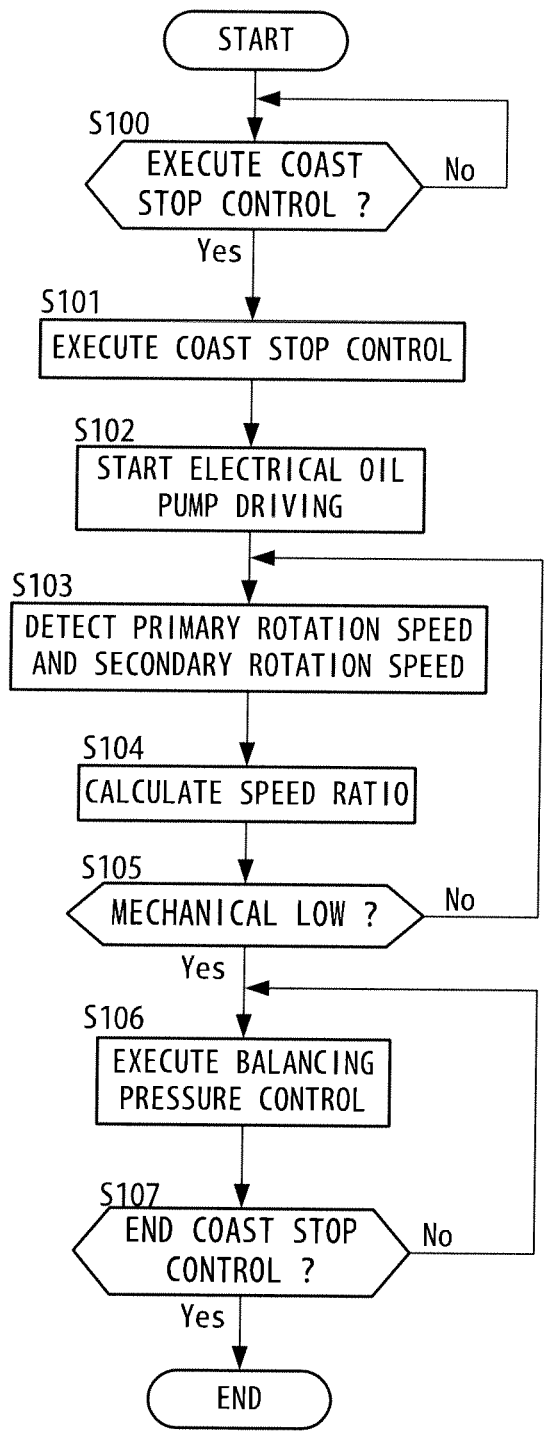
FIG. 4 is a flow chart showing a hydraulic control in the case of executing a coast stop control of the embodiment.

Next, a hydraulic control in the case of executing the coast stop control is described with reference to a flow chart of FIG. 4. Here, the hydraulic control is so executed that the speed ratio is not changed to a higher side than the lowest speed ratio, i.e. no upshifting is performed at the time of starting the coast stop control or during the coast stop control.

In Step S100, the controller 12 judges whether or not to execute the coast stop control. Here, the controller 12 determines whether or not all the above conditions a to d are met. The process proceeds to Step S101 if all the conditions a to d are met, and this control is repeated if any of the conditions a to d is not met.

In Step S101, the controller 12 executes the coast stop control. Here, fuel supply to the engine 1 is stopped to automatically stop the engine 1. Note that the mechanical oil pump 10m also stops when the engine 1 stops.

In Step S102, the controller 12 starts driving the electrical oil pump 10e and sets a hydraulic pressure supplied to the hydraulic cylinder 23b of the secondary pulley 22 (hereinafter, referred to as a secondary pulley pressure Psec) to a maximum pressure of the electrical oil pump 10e. Further, a hydraulic pressure supplied to the hydraulic cylinder 23a of the primary pulley 21 (hereinafter, referred to as a primary pulley pressure Ppri) is drained to set the primary pulley pressure Ppri to substantially zero.

Since the secondary pulley pressure Psec is set to the maximum pressure of the electrical oil pump 10e and the primary pulley pressure Ppri is set to substantially zero, a force for holding the V-belt 23 at the secondary pulley 22 is equal to or larger than a force for holding the V-belt 23 at the primary pulley 21. As a result, the movable conical plate 21b of the primary pulley 21 moves until coming into contact with the stopper 50 for mechanically restricting the movement of the movable conical plate 21b. In this state, the speed ratio is larger than the lowest speed ratio used such as at the time of starting the vehicle (hereinafter, referred to as mechanical low). Note that substantially zero includes a case where the primary pulley pressure Ppri becomes completely zero and a case where the primary pulley pressure Ppri cannot be completely zeroed, for example, due to the control of the controller 12 and a slight hydraulic pressure remains in the hydraulic cylinder 23a.

In Step S103, the controller 12 detects the primary rotation speed Npri by the rotation speed sensor 42 and detects the secondary rotation speed Nsec by the rotation speed sensor 48.

In Step S104, the controller 12 calculates the present speed ratio from the primary rotation speed Npri and the secondary rotation speed Nsec.

In Step S105, the controller 12 determines whether or not the speed ratio calculated in Step S104 is mechanical low. The process proceeds to Step S106 if the speed ratio is mechanical low while returning to Step S103 to repeat the above control if the speed ratio is not mechanical low.

In Step S106, the controller 12 executes a balancing pressure control for controlling the primary pulley pressure Ppri to a balancing pressure. In the balancing pressure control, the secondary pulley pressure Psec is kept at the maximum pressure of the electrical oil pump 10e and the primary pulley pressure Ppri is so controlled that the speed ratio becomes the lowest speed ratio. That is, the balancing pressure is such a primary pulley pressure Ppri that the V-belt 23 does not slip at the time of starting the vehicle and the speed ratio becomes the lowest speed ratio in a state where the secondary pulley pressure Psec is set at the maximum pressure of the electrical oil pump 10e. The balancing pressure is changed, for example, by a load state seen from the variator 20 and changed by the engaged state of the sub-transmission mechanism 30.

Figure 5:
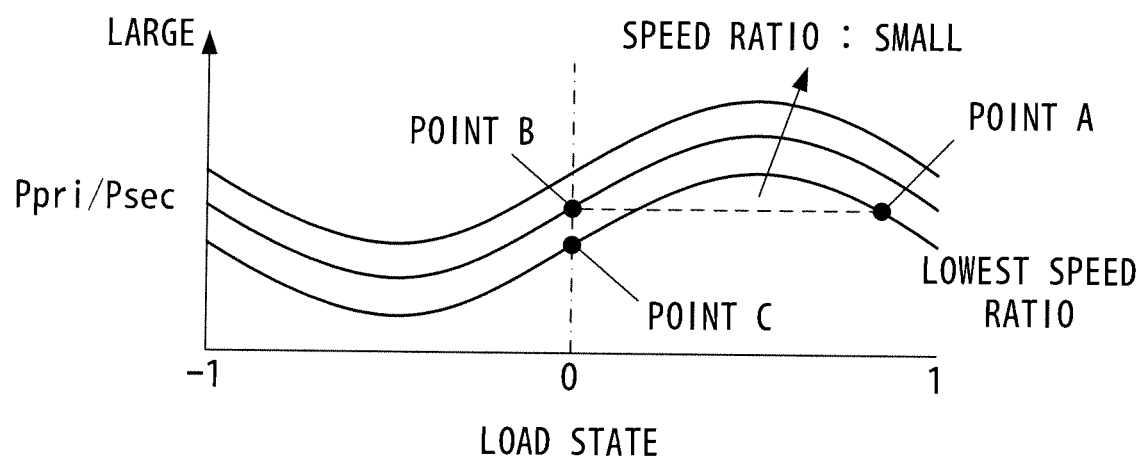
FIG. 5 is graph showing balancing pressures during the coast stop control.

The balancing pressure is described using FIG. 5. FIG. 5 is a graph showing a relationship of the load state seen from the variator 20, a ratio of the primary pulley pressure Ppri to the secondary pulley pressure Psec and the speed ratio. It is assumed that the secondary pulley pressure Psec is kept at the maximum pressure of the electrical oil pump 10e.

The load state seen from the variator 20 is "0", i.e. a no-load state when all the frictional engagement elements 32 to 34 of the sub-transmission mechanism 30 are released. Further, the load state seen from the variator 20 is "1", i.e. a load state where a limit torque capacity which does not cause belt slippage is set when any of the frictional engagement elements 32 to 34 of the sub-transmission mechanism 30 is engaged and power is transmitted from the engine 1 to the variator 20. Furthermore, the load state seen from the variator 20 is "-1", i.e. a load state where the limit torque capacity which does not cause belt slippage is set when any of the frictional engagement elements 32 to 34 of the sub-transmission mechanism 30 is engaged and, for example, the vehicle is running downhill, the accelerator pedal is not depressed and power is transmitted from the drive wheels 7 to the variator 20.

The primary pulley pressure Ppri is a certain balancing pressure when the speed ratio is the lowest speed ratio and, for example, the low brake 32 of the sub-transmission mechanism 30 is engaged during the coast stop control. This state is assumed to be a point A in FIG. 5.

If the primary pulley pressure Ppri is kept at the primary pulley pressure Ppri at the point A when, for example, the low brake 32 is released in this state and the variator 20 is set in the no-load state, the speed ratio is changed from the lowest speed ratio to a speed ratio at the high side. This state is assumed to be a point B in FIG. 5.

Accordingly, in this embodiment, the balancing pressure is so changed that the speed ratio is maintained at the lowest speed ratio even in such a case. Here, the balancing pressure (primary pulley pressure Ppri) is reduced. This state is assumed to be a point C in FIG. 5.

In Step S107, the controller 12 determines whether or not to end the coast stop control. A condition to end the coast stop control is, for example, that any of the above conditions a to d is no longer met. This control is ended if the coast stop control is ended, and the process returns to Step S106 to repeat the above control if the coast stop control is not ended.

Note that, when the coast stop control is executed and the vehicle stops, the hydraulic pressures supplied to the hydraulic cylinders 23a, 23b of the primary pulley 21 and the secondary pulley 22 are kept at the above hydraulic pressures. Further, when any of the above conditions a to d is no longer met, fuel supply to the engine 1 is resumed to restart the engine 1 and the electrical oil pump 10e is stopped when the mechanical oil pump 10m comes to produce a sufficient hydraulic pressure.

Figure 6:
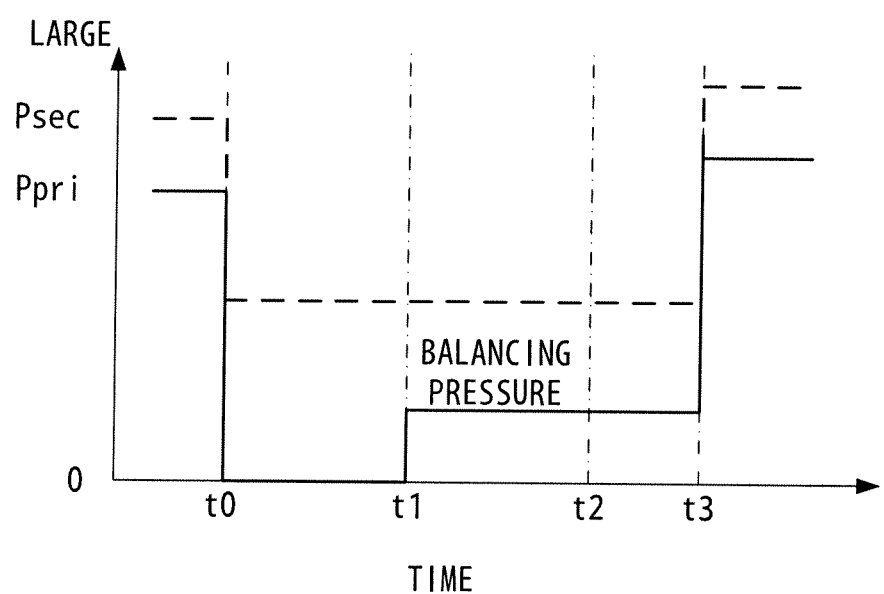
FIG. 6 is a time chart showing changes in a primary pulley pressure and a secondary pulley pressure in the case of executing the coast stop control of the embodiment.

Next, changes in the hydraulic pressures in the case of executing the coast stop control are described using a time chart of FIG. 6. In FIG. 6, the primary pulley pressure Ppri is indicated by solid line and the secondary pulley pressure Psec is indicated by broken line.

Before executing the coast stop control, the primary pulley pressure Ppri and the secondary pulley pressure Psec are controlled according to the driving condition of the vehicle.

If all the above coast stop conditions a to d are met at time t0, the engine 1 is stopped, the drive of the electrical oil pump 10e is started, the secondary pulley pressure Psec is set to the maximum pressure of the electrical oil pump 10e and the primary pulley pressure Ppri is set to substantially zero. In this way, the speed ratio becomes mechanical low.

If it is confirmed that the speed ratio has become mechanical low at time t1, the primary pulley pressure Ppri is set to the balancing pressure with the secondary pulley pressure Psec kept at the maximum pressure of the electrical oil pump 10e. In this way, the speed ratio becomes the lowest speed ratio.

If the vehicle stops at time t2, the primary pulley pressure Ppri is kept at the balancing pressure and the secondary pulley pressure Psec is kept at the maximum pressure of the electrical oil pump 10e.

If, for example, the accelerator pedal is depressed at time t3, the engine 1 is restarted. When the discharge pressure of the mechanical oil pump 10m becomes higher than that of the electrical oil pump 10e, the electrical oil pump 10e is stopped and the primary pulley pressure Ppri and the secondary pulley pressure Psec are supplied by the mechanical oil pump 10m.

Effects of the embodiment of the present invention are described.

By preventing the speed ratio from being shifted to the higher side than the lowest speed ratio during the coast stop control, it can be prevented that a drive force becomes insufficient at the time of restarting the vehicle and at the time of re-acceleration.

It can be prevented that the speed ratio is shifted to the higher side than the lowest speed ratio during the coast stop control by simply controlling the hydraulic pressures supplied to the variator 20.

By releasing the frictional engagement elements 32 to 34 of the sub-transmission mechanism 30 during the coast stop control, it is possible to reduce the load seen from the variator 20 and reduce a hydraulic pressure necessary to prevent the speed ratio from being shifted to the high side in the variator 20. Thus, by the supply of the hydraulic pressures only by the electrical oil pump 10e, it is possible to prevent the speed ratio from being shifted to the high side and prevent the drive force from becoming insufficient at the time of restarting the vehicle and at the time of re-acceleration.

For example, if the coast stop control is executed and the supply of the hydraulic pressures to the variator 20 is switched from the mechanical oil pump 10m to the electrical oil pump 10e, the hydraulic pressures that can be supplied to the variator 20 are reduced. In this embodiment, the hydraulic pressure supplied to the hydraulic cylinder 23a of the primary pulley 21 can be reduced by bringing the movable conical plate 21b of the primary pulley 21 into contact with the stopper 50 during the coast stop control to make the speed ratio mechanical low, and the speed ratio can be prevented from being shifted to the high side by the hydraulic pressure supplied from the electrical oil pump 10e.

In the variator 20, the pressure receiving area of the primary pulley 21 is lager than that of the secondary pulley 22 to reduce a necessary hydraulic pressure at the time of upshifting. If the pressure receiving area of the hydraulic cylinder 23a of the primary pulley 21 is large, a torque capacity change with respect to a change in the hydraulic pressure supplied to the hydraulic cylinder 23a increases. Thus, the speed ratio becomes more likely to change to the high side by the change in the hydraulic pressure supplied to the hydraulic cylinder 23a. In this embodiment, the primary pulley pressure Ppri and the secondary pulley pressure Psec can be easily controlled, the hydraulic pressure change can be reduced and the speed ratio can be prevented from being shifted to the high side by setting the primary pulley pressure Ppri to substantially zero and setting the secondary pulley pressure Psec to the maximum pressure of the electrical oil pump 10e during the coast stop control. Further, if the speed ratio at the time of starting the coast stop control is not lowest, the speed ratio can be quickly changed to the lowest speed ratio.

By setting the primary pulley pressure Ppri to the balancing pressure after the primary pulley pressure Ppri becomes substantially zero and the speed ratio of the variator 20 becomes mechanical low, the primary pulley pressure Ppri can be quickly increased at the time of restart or re-acceleration and a shortage in the drive force can be suppressed by suppressing the slippage of the V-belt 23.

Note that, in the case of executing the coast stop control, the drive of the electrical oil pump 10e may be started before the mechanical oil pump 10m is stopped. In this case, the hydraulic pressure produced by the electrical oil pump 10e is supplied to the hydraulic cylinders 23a, 23b when the discharge pressure of the electrical oil pump 10e becomes higher than that of the mechanical oil pump 10m.

The hydraulic pressure supplied from the electrical oil pump 10e to the hydraulic cylinder 23b of the secondary pulley 22 may not be the maximum pressure of the electrical oil pump 10e and may be any hydraulic pressure provided that the speed ratio can be mechanical low in Step S102 and the speed ratio can be the lowest speed ratio in Step S106.

When all the coast stop conditions are met and the coast stop control is started, the frictional engagement elements 32 to 34 of the sub-transmission mechanism 30 may be released. Further, the hydraulic control in this embodiment may be executed when the engaged states of the frictional engagement elements 32 to 34 are slip states.

If the engaged states of the frictional engagement elements 32 to 34 of the sub-transmission mechanism 30 are, for example, changed during the balancing pressure control, the speed ratio of the variator 20 may be set to be mechanical low and, thereafter, an appropriate balancing pressure may be set.

Although the vehicle including the variator 20 and the sub-transmission mechanism 30, which is a transmission with two forward speeds, has been described in this embodiment, there is no limitation to this and the above coast stop control may be executed in a vehicle including, for example, a variator and a stepped transmission mechanism with three or more forward speeds or including a variator and a forward/reverse switching mechanism.

The coast stop control may be executed after the speed ratio of the variator 20 becomes the lowest speed ratio or before the speed ratio of the variator 20 becomes the lowest speed ratio. In the case of executing the coast stop control before the speed ratio of the variator 20 becomes the lowest speed ratio, the speed ratio during the coast stop control may be maintained at the speed ratio at the time of starting the coast stop control or may be temporarily set to be mechanical low and then set to be the lowest speed ratio as in this embodiment. That is, the variator 20 only has to be so controlled that the speed ratio thereof is not upshifted to the higher side than the speed ratio at the time of starting the coast stop control during the coast stop control.

Although the hydraulic pressures supplied to the variator 20 are controlled by the electrical oil pump 10e so that the speed ratio of the variator 20 is not upshifted during the coast stop control in this embodiment, there is no limitation to this. For example, an accumulator may be provided in a hydraulic circuit and the hydraulic pressures supplied to the variator 20 may be controlled by the accumulator so that the speed ratio of the variator 20 is not upshifted during the coast stop control.

The present invention is not limited to the above embodiment and it goes without saying that the present invention includes various modifications and improvements which can be made within the scope of the technical concept thereof.

This application claims priority from Japanese Patent Application No. 2010-223445, filed Oct. 1, 2010, which is incorporated herein by reference in its entirety.

What is claimed is:

1. A coast stop vehicle configured to stop an engine during a travel of the vehicle, comprising:
   a continuously variable transmission including a pair of pulleys and a belt mounted between the pair of pulleys and capable of continuously changing a speed ratio;
   a coast stop condition judging unit configured to judge whether or not a coast stop condition to stop the engine during the travel of the vehicle holds;
   a coast stop control unit configured to execute a coast stop control to stop the engine when the coast stop condition holds; and
   an upshift preventing unit,
   wherein, during an entire time of the coast stop control, the engine being stopped during the entire time of the coast stop control, the upshift preventing unit is configured to prevent the speed ratio from being upshifted to a higher side than a speed ratio at a time of starting the coast stop control from a beginning of the coast stop control and to continue the prevention of an upshift regardless of the speed ratio in the continuously variable transmission during the coast stop control.

2. The coast stop vehicle according to claim 1, wherein the pair of pulleys comprises a primary pulley and a secondary pulley, and wherein the upshift preventing unit is configured to prevent the speed ratio from being upshifted to the higher side by controlling a hydraulic pressure supplied to the continuously variable transmission so that a belt holding force at the secondary pulley is equal to or larger than a belt holding force at the primary pulley.

3. The coast stop vehicle according to claim 1, further comprising:
a frictional engagement element provided at least either between the engine and the continuously variable transmission or between the continuously variable transmission and drive wheels, wherein the frictional engagement element is configured to enable power transmission when being engaged and to disable the power transmission when being released; and
a frictional engagement element releasing unit configured to set the frictional engagement element in a slip state or a released state at the time of starting the coast stop control or during the coast stop control.

4. The coast stop vehicle according to claim 1, further comprising a stopper configured to restrict a movement of a movable conical plate of a primary pulley from the pair of pulleys in a direction to increase a groove width of the primary pulley, wherein the upshift preventing unit is configured to prevent the speed ratio from being upshifted to the higher side by bringing the movable conical plate of the primary pulley into contact with the stopper after the starting of the coast stop control.

5. The coast stop vehicle according to claim 4, further comprising an electrical oil pump configured to produce a hydraulic pressure to be supplied to the continuously variable transmission during the coast stop control, wherein the upshift preventing unit is configured, for prevention of the speed ratio from being upshifted to the higher side, to set a primary pulley pressure of the continuously variable transmission to substantially zero and to set a secondary pulley pressure of the continuously variable transmission at a maximum pressure of the electrical oil pump.

6. The coast stop vehicle according to claim 4, wherein the upshift preventing unit is configured, for prevention of the speed ratio from being upshifted to the higher side, to control a primary pulley pressure of the continuously variable transmission so that the speed ratio becomes a lowest speed ratio after the movable conical plate of the primary pulley is brought into contact with the stopper.

7. A control method for a coast stop vehicle which comprises a continuously variable transmission including a pair of pulleys and a belt mounted between the pair of pulleys and capable of continuously changing a speed ratio and stopping an engine during a travel of the vehicle, comprising:
judging whether or not a coast stop condition to stop the engine during the travel of the vehicle holds;
executing a coast stop control to stop the engine when the coast stop condition holds; and
preventing the speed ratio from being upshifted to a higher side than a speed ratio at a time of starting the coast stop control during an entire time of the coast stop control, the engine being stopped during the entire time of the coast stop control, the prevention being from a beginning of the coast stop control and continuing so as to prevent an upshift regardless of the speed ratio in the continuously variable transmission during the coast stop control.

8. The control method according to claim 7, wherein the pair of pulleys comprises a primary pulley and a secondary pulley, and wherein the speed ratio is prevented from being upshifted to the higher side by controlling a hydraulic pressure supplied to the continuously variable transmission so that a belt holding force at the secondary pulley is equal to or larger than a belt holding force at the primary pulley.

9. The control method according to claim 7, wherein the coast stop vehicle further comprises a frictional engagement element which is provided at least either between the engine and the continuously variable transmission or between the continuously variable transmission and drive wheels, wherein the frictional engagement element enables power transmission when being engaged and disables the power transmission when being released; and wherein the control method further comprises setting the frictional engagement element in a slip state or a released state at the time of starting the coast stop control or during the coast stop control.

10. The control method according to claim 7, wherein the coast stop vehicle further comprises a stopper restricting a movement of a movable conical plate of a primary pulley from the pair of pulleys in a direction to increase a groove width of the primary pulley, and wherein the speed ratio is prevented from being upshifted to the higher side by bringing the movable conical plate of the primary pulley into contact with the stopper after the starting of the coast stop control.

11. The control method according to claim 10, wherein the coast stop vehicle further comprises an electrical oil pump producing a hydraulic pressure to be supplied to the continuously variable transmission during the coast stop control, and wherein, for preventing the speed ratio from being upshifted to the higher side, a primary pulley pressure of the continuously variable transmission is set to substantially zero and a secondary pulley pressure of the continuously variable transmission is set at a maximum pressure of the electrical oil pump.

12. The control method according to claim 10, wherein, for preventing the speed ratio from being upshifted to the higher side, a primary pulley pressure of the continuously variable transmission is controlled so that the speed ratio becomes a lowest speed ratio after the movable conical plate of the primary pulley is brought into contact with the stopper.

13. A coast stop vehicle which stops an engine during a travel of the vehicle, comprising:
a continuously variable transmission including a pair of pulleys and a belt mounted between the pair of pulleys and capable of continuously changing a speed ratio;
coast stop condition judging means for judging whether or not a coast stop condition to stop the engine during the travel of the vehicle holds;
coast stop control means for executing a coast stop control to stop the engine when the coast stop condition holds; and
upshift preventing means for preventing the speed ratio from being upshifted to a higher side than a speed ratio at a time of starting the coast stop control during an entire time of the coast stop control, the engine being stopped during the entire time of the coast stop control, the prevention being from a beginning of the coast stop control and continuing so as to prevent an upshift regardless of the speed ratio in the continuously variable transmission during the coast stop control.

14. The coast stop vehicle according to claim 13, wherein the pair of pulleys comprises a primary pulley and a secondary pulley, and wherein the upshift preventing means prevents the speed ratio from being upshifted to the higher side by controlling a hydraulic pressure supplied to the continuously variable transmission so that a belt holding force at the secondary pulley is equal to or larger than that at the primary pulley.

15. The coast stop vehicle according to claim 13, further comprising:

a frictional engagement element which is provided at least either between the engine and the continuously variable transmission or between the continuously variable transmission and drive wheels and enables power transmission when being engaged and disables the power transmission when being released; and frictional engagement element releasing means for setting the frictional engagement element in a slip state or a released state at the time of starting the coast stop control or during the coast stop control.

16. The coast stop vehicle according to claim 13, further comprising a stopper for restricting a movement of a movable conical plate of a primary pulley from the pair of pulleys in a direction to increase a groove width of the primary pulley, wherein the upshift preventing means prevents the speed ratio from being upshifted to the higher side by bringing the movable conical plate of the primary pulley into contact with the stopper after the starting of the coast stop control.

17. The coast stop vehicle according to claim 13, further comprising an electrical oil pump for producing a hydraulic pressure to be supplied to the continuously variable transmission during the coast stop control, wherein the upshift preventing means prevents the speed ratio from being upshifted to the higher side by setting a primary pulley pressure of the continuously variable transmission to substantially zero and setting a secondary pulley pressure of the continuously variable transmission at a maximum pressure of the electrical oil pump.

18. The coast stop vehicle according to claim 16, wherein the upshift preventing means, for preventing the speed ratio from being upshifted to the higher side, controls a primary pulley pressure of the continuously variable transmission so that the speed ratio becomes a lowest speed ratio after the movable conical plate of the primary pulley is brought into contact with the stopper.

19. The coast stop vehicle according to claim 1, wherein, during the entire time of the coast stop control, the upshift preventing unit is configured to execute pressure control, after execution of the coast stop control, for controlling hydraulic pressures to the continuously variable transmission so as to prevent the speed ratio from being upshifted to the higher side than the speed ratio at the time of starting the coast stop control.

20. The coast stop vehicle according to claim 1, wherein, during the entire time of the coast stop control, the upshift preventing unit is configured to execute control, after execution of the coast stop control, so as to prevent the speed ratio from being upshifted to the higher side than the speed ratio at the time of starting the coast stop control.

* * * * *